(12) United States Patent
Tsai et al.

(10) Patent No.: US 11,298,831 B2
(45) Date of Patent: *Apr. 12, 2022

(54) ROBOTIC SYSTEM CAPABLE OF FACILITATING RETURN ALIGNMENT

(71) Applicant: Quanta Computer Inc., Taoyuan (TW)

(72) Inventors: Sheng-An Tsai, Taoyuan (TW); Lu-Lung Tsao, Taoyuan (TW); Yu-Ching Tsai, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 843 days.

This patent is subject to a terminal disclaimer.

(21) Appl. No.: 16/166,268

(22) Filed: Oct. 22, 2018

(65) Prior Publication Data

US 2020/0001466 A1   Jan. 2, 2020

(51) Int. Cl.
| | |
|---|---|
| *G05D 1/03* | (2006.01) |
| *B25J 11/00* | (2006.01) |
| *B25J 5/00* | (2006.01) |
| *B25J 9/16* | (2006.01) |
| *B25J 9/00* | (2006.01) |
| *A47L 11/24* | (2006.01) |
| *A47L 11/28* | (2006.01) |

(Continued)

(52) U.S. Cl.
CPC ......... *B25J 11/0085* (2013.01); *A47L 9/0063* (2013.01); *A47L 11/24* (2013.01); *A47L 11/28* (2013.01); *A47L 11/4011* (2013.01); *B25J 5/007* (2013.01); *B25J 9/0009* (2013.01); *B25J 9/1697* (2013.01); *A47L 2201/022* (2013.01)

(58) Field of Classification Search
CPC ........ B25J 11/008; B25J 5/007; B25J 9/1697; B25J 9/0009; B25J 11/0085; A47L 11/24; A47L 11/28; A47L 9/0063; A47L 11/4011; G05D 1/03; G06F 1/16; H02J 7/02

See application file for complete search history.

(56) References Cited

U.S. PATENT DOCUMENTS 6,389,329 B1 *  5/2002  Colens ................. A47L 9/2852
                                                          700/262
6,532,404 B2 *  3/2003  Colens ................ A47L 11/4005
                                                          180/167

(Continued)

FOREIGN PATENT DOCUMENTS

| CN | 105846522 A | 8/2016 |
|---|---|---|
| CN | 105896664 A | 8/2016 |

(Continued)

OTHER PUBLICATIONS

Silverman et al., Staying alive: a docking station for autonomous robot recharging, 2002, IEEE, p. 1050-1055 (Year: 2002).*

(Continued)

*Primary Examiner* — McDieunel Marc (57) ABSTRACT

A robotic system for facilitating return alignment includes a docking station and a mobile working machine. The docking station includes a charging module and a confirmation element. The mobile working machine includes a power module and a sensing device electrically connected to the power module. When the mobile working machine is moved to one side of the docking station to trigger the sensing device by the confirmation element, the charging module starts to electrically charge the power module.

10 Claims, 7 Drawing Sheets

(51) Int. Cl.
*A47L 11/40* (2006.01)
*A47L 9/00* (2006.01)

(56) References Cited

U.S. PATENT DOCUMENTS

| | | | | |
|---|---|---|---|---|
| 6,748,297 B2* | 6/2004 | Song | ................... | G05D 1/0225 |
| | | | | 700/259 |
| 7,133,746 B2* | 11/2006 | Abramson | ........... | G05D 1/0225 |
| | | | | 700/259 |
| 7,389,156 B2* | 6/2008 | Ziegler | .............. | A22C 17/0013 |
| | | | | 318/568.1 |
| 7,620,476 B2* | 11/2009 | Morse | ....................... | A47L 5/14 |
| | | | | 15/319 |
| 8,046,103 B2* | 10/2011 | Abramson | ........... | A01D 34/008 |
| | | | | 700/258 |
| 11,117,264 B2* | 9/2021 | Tsai | ....................... | B25J 9/1694 |
| 2007/0016328 A1 | 1/2007 | Ziegler et al. | | |
| 2008/0058987 A1 | 3/2008 | Ozick et al. | | |

FOREIGN PATENT DOCUMENTS

| | | |
|---|---|---|
| CN | 106685098 A | 5/2017 |
| JP | 2015202887 A | 11/2015 |
| TW | 201335728 A | 9/2013 |
| TW | 201342771 A | 10/2013 |
| TW | 201811253 A | 4/2018 |

OTHER PUBLICATIONS

Balakrishnan et al., A smart spy robot charged and controlled by wireless systems, 2015, IEEE, p. 1-4 (Year: 2015).*

Zhang et al., Battery swapping and wireless charging for a home robot system with remote human assistance, 2013, IEEE, p. 747-755 (Year: 2013).*

Song et al., Automatic docking system for recharging home surveillance robots, 2011, IEEE, p. (Year: 2011).*

* cited by examiner

ROBOTIC SYSTEM CAPABLE OF FACILITATING RETURN ALIGNMENT

RELATED APPLICATIONS

This application claims priority to Taiwan Application Serial Number 107122386, filed Jun. 28, 2018, which is herein incorporated by reference.

BACKGROUND

Field of Disclosure

The disclosure relates to a robotic system. More particularly, the disclosure relates to a robotic system capable of facilitating return alignment.

Description of Related Art

With the development of science technology, varieties of smart life electronic products are provided in the industry to enhance the convenience of the human life. For example, a vacuum sweeping machine is able to automatically move around and clean by itself so as to reduce the chance of clean work by human. After cleaning, the vacuum sweeping machine can automatically return to a docking station for charging and parking.

However, if the vacuum sweeping machine returning to the docking station is errored in angle or position to fail retuning, not only the vacuum sweeping machine may be evaluated not smart enough when returning, but also the energy consumption of the vacuum sweeping machine caused by repeatedly attempting to return may reduce the overall efficiency of the vacuum sweeping machine.

SUMMARY

In one embodiment of the disclosure, a robotic system capable of facilitating return alignment is provided. The robotic system includes a docking station and a mobile working machine. The docking station includes a confirmation element and a charging module. The charging module is provided with a first contact. The mobile working machine includes a transmission wheel device, at least one sensing device and a power module. The power module is electrically connected to the sensing device and the transmission wheel device, and the power module is provided with a second contact. Thus, when the mobile working machine is moved to one side of the docking station by the transmission wheel device, and the sensing device is triggered by the confirmation element, the power module is electrically charged by the charging module as the first contact and the second contact are contacted with each other.

According to one or more embodiments of the disclosure, in the robotic system, when the mobile working machine attempts to dock to the side of the docking station, and when the sensing device is not triggered by the confirmation element in a period of time, the transmission wheel device moves the mobile working machine away from the docking station for attempting to return to the docking station again.

According to one or more embodiments of the disclosure, in the robotic system, the docking station further includes two guiding portions. The guiding portions are disposed on the side of the docking station. The guiding portions are arranged at two opposite sides of the first contact. The guiding portions are used to guide the mobile working machine to dock such that the sensing device is able to be triggered by the confirmation element.

According to one or more embodiments of the disclosure, in the robotic system, each of the guiding portions is provided with a guiding sidewall. The guiding sidewalls of the guiding portions are faced opposite to each other, and one part of each of the guiding sidewalls is gradually adjacent to the first contact. The mobile working machine further includes two rotating members. The rotating members are rotatably disposed on the mobile working machine, and arranged opposite to each other. The rotating members are able to directly roll on the guiding sidewalls, respectively.

According to one or more embodiments of the disclosure, in the robotic system, the confirmation element includes a plate body and an optical control coating layer, the plate body at least is connected to one of the guiding portions, and the optical control coating layer is formed on one surface of the plate body.

According to one or more embodiments of the disclosure, in the robotic system, the docking station further includes at least one first alignment portion which is located at the one side of the docking station. The mobile working machine further includes at least one second alignment portion which is complementary to the first alignment portion in shape. The second alignment portion is used to splice with the first alignment portion so as to determine the correct positions of the mobile working machine and the docking station.

According to one or more embodiments of the disclosure, in the robotic system, the sensing device is an optical transceiver. The confirmation element is an optical control surface. Thus, when the optical transceiver is unable to receive any reflective light from the optical control surface after the optical transceiver emits lights to the optical control surface, the sensing device is triggered by the confirmation element.

According to one or more embodiments of the disclosure, in the robotic system, the mobile working machine is a vacuum sweeping machine, a mopping machine, a security patrol machine, or a detachable base of an intelligent robot.

In one embodiment of the disclosure, a robotic system capable of facilitating return alignment is provided. The robotic system includes a mobile working machine and a docking station. The mobile working machine includes a machine body, at least one sensing device and a transmission wheel device. The transmission wheel device and the sensing device are respectively disposed on the machine body. The transmission wheel device loads and moves the machine body. The docking station includes a station base, a confirmation element and two guiding elements. The guiding elements are connected to the station base so that a docking concave is collectively defined by the station base and the guiding elements. The confirmation element is located within the docking concave. Each of the guiding elements is provided with a guiding portion. The guiding portions of the guiding elements are used to guide the mobile working machine to dock correctly such that the sensing device can be triggered by the confirmation element. Thus, when the sensing device is not triggered by the confirmation element in a period of time, the transmission wheel device moves the machine body away from the docking concave, and then attempts to return to the docking concave again.

According to one or more embodiments of the disclosure, in the robotic system, the mobile working machine further comprises two rotating members, the rotating members are rotatably disposed on the machine body, and arranged opposite to each other, each of the rotating members is able to directly roll on one of the guiding sidewalls.

In one embodiment of the disclosure, a mobile working machine is provided. The mobile working machine includes a machine body, at least one rotating member, at least one sensing device and a transmission wheel device. The rotating member is rotatably disposed on the machine body, and configured to directly roll on a docking station. The sensing device is disposed on the machine body. The transmission wheel device is disposed on the machine body, and configured to load and move the machine body. An axis line of the rotating member is orthogonal to an axis line of the transmission wheel device.

Thus, in the construction of the embodiments above, an incorrected or unexpected docking condition can be avoided so as to effectively facilitate the mobile working machine to accurately return to the docking station, and improve the success rate of the mobile working machine returning to the docking station, thereby reducing the unnecessary energy consumption of the mobile working machine.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 1:
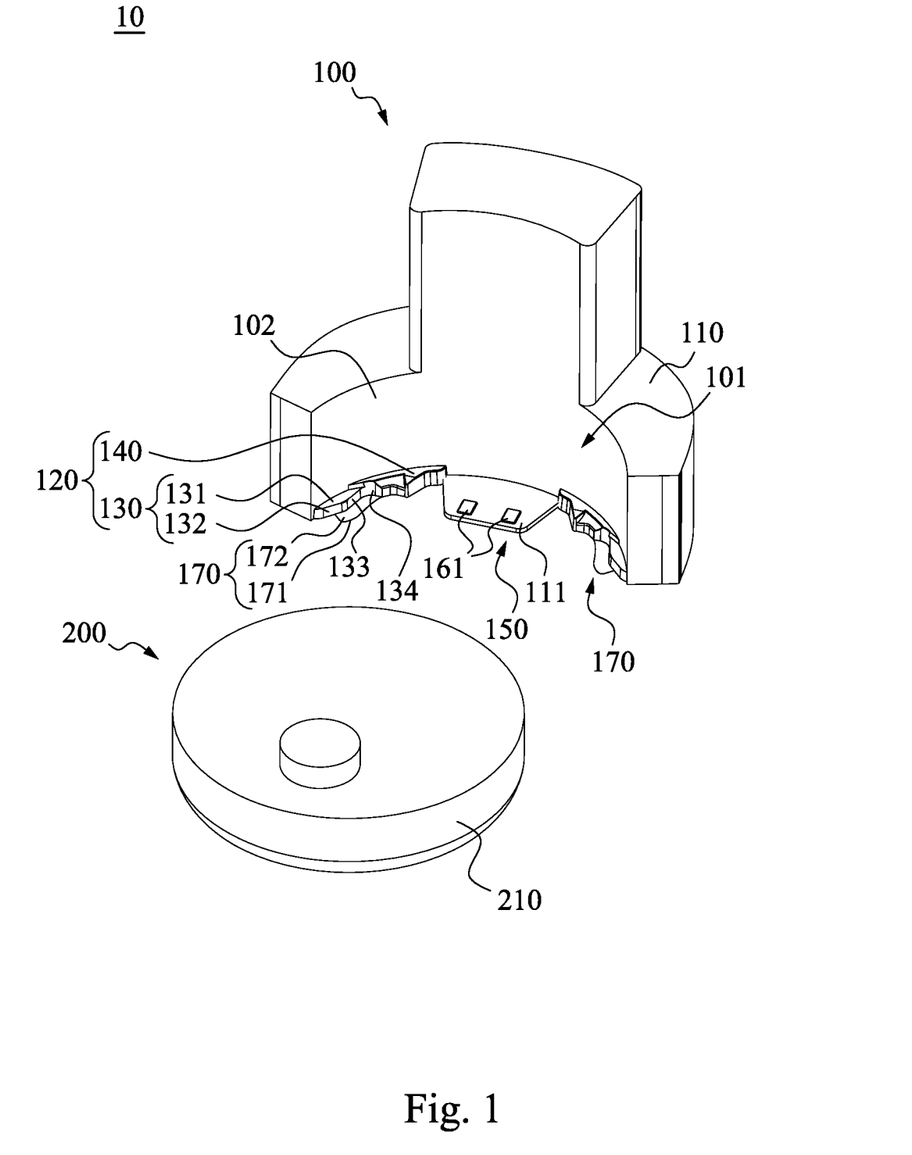
FIG. 1 is a perspective view of a mobile working machine of a robotic system that has not docked to a docking station yet according to one embodiment of the disclosure.
Figure 2:
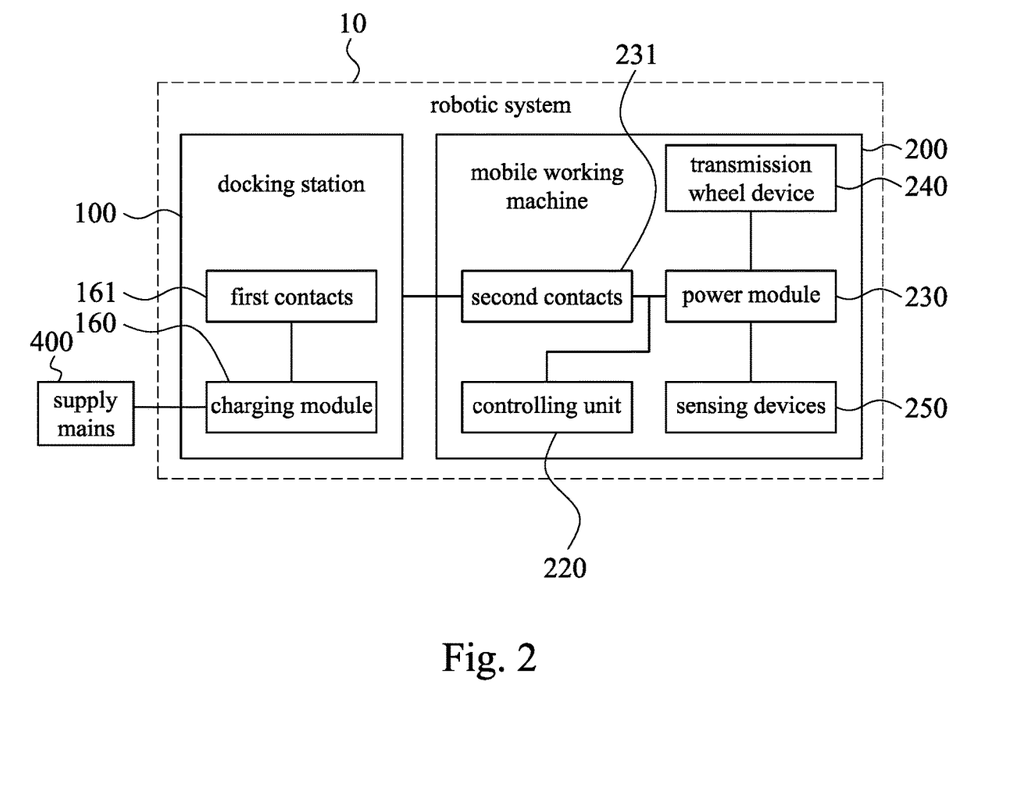
FIG. 2 is an electronic block diagram of the robotic system of FIG. 1.
Figure 3:
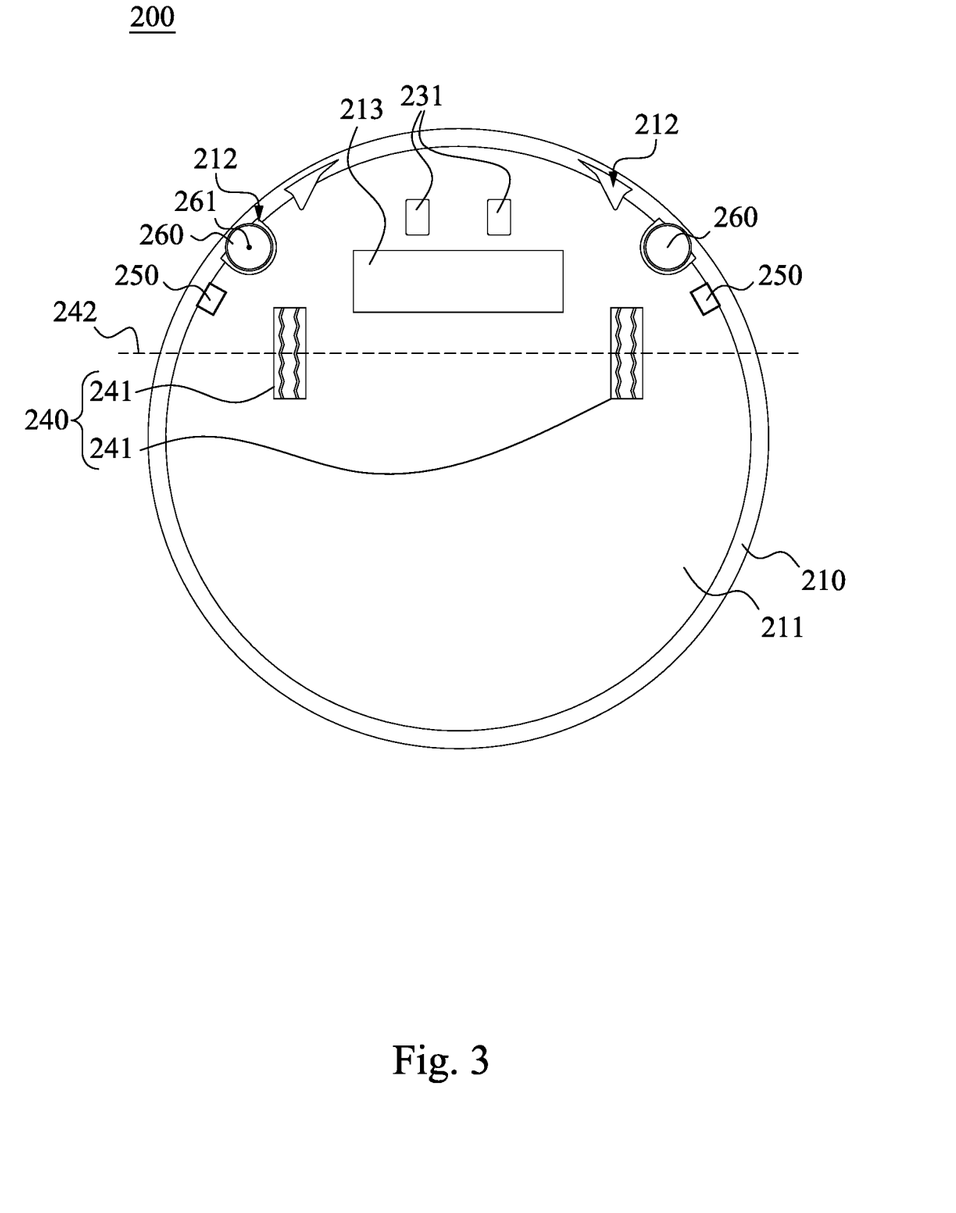
FIG. 3 is a bottom view of the mobile working machine of FIG. 1.

Reference is now made to FIG. 1 to FIG. 3, in which FIG. 1 is a perspective view of a mobile working machine 200 of a robotic system 10 that has not docked to a docking station 100 yet according to one embodiment of the disclosure, FIG. 2 is an electronic block diagram of the robotic system 10 of FIG. 1, and FIG. 3 is a bottom view of the mobile working machine 200 of FIG. 1. As shown in FIG. 1 to FIG. 3, the robotic system 10 includes a docking station 100 and a mobile working machine 200. The docking station 100 includes a station base 110, a charging module 160 and one or more (e.g., two) confirmation elements 170. The charging module 160 and the confirmation elements 170 are respectively disposed on the station base 110. For example, the charging module 160 includes a charging circuit (not shown in figures) and one or more (e.g., two) first contacts 161. The charging circuit is arranged in the station base 110. The first contacts 161 are located at one side (e.g., a docking side 102) of the station base 110, electrically connected to the charging circuit, and exposed outwards from the outer surface of the station base 110. The confirmation elements 170 are exposed on the outer surface of the station base 110. The mobile working machine 200 includes a machine body 210, a controlling unit 220, a power module 230, a transmission wheel device 240 and one or more (e.g., two) sensing devices 250. The controlling unit 220, the transmission wheel device 240, the power module 230 and the sensing devices 250 are respectively disposed on the machine body 210. The power module 230 is electrically connected to the controlling unit 220, the sensing devices 250 and the transmission wheel device 240 for providing supply power which are required. For example, the power module 230 has an arrangement circuit (not shown in figures) and one or more (e.g., two) second contacts 231. The arrangement circuit is arranged in the machine body 210. The second contacts 231 are located at a bottom surface 211 of the machine body 210, electrically connected to the arrangement circuit, and exposed outwards from the outer surface of the machine body 210. The controlling unit 220 is disposed in the machine body 210, and electrically connected to the transmission wheel device 240 and the sensing devices 250. The sensing devices 250 are partially exposed outwards from the bottom surface 211 of the machine body 210. The transmission wheel device 240 is installed at the bottom surface 211 of the machine body 210 for loading the machine body 210 and moving the machine body 210 on a ground surface. Thus, when the mobile working machine 200 arrives at the docking side 102 of the docking station 100, such that the second contacts 231 of the mobile working machine 200 are in direct contact with the first contacts 161 of the docking station 100 and each of the sensing devices 250 is triggered by one of the confirmation elements 170, in response to that, the power module 230 is electrically charged by the charging module 160 by the first contacts 161 and the second contacts 231 which are contacted with each other.

Thus, in the construction of the embodiment above, incorrected or unexpected docking conditions can be avoided so as to effectively facilitate the mobile working machine to accurately return to the docking station, and improve the success rate of the mobile working machine returning to the docking station, thereby reducing the unnecessary energy consumption of the mobile working machine.

When the mobile working machine 200 receives an instruction of a return procedure, the controlling unit 220 starts to electrically control the transmission wheel device 240 to move the mobile working machine 200 towards the docking station 100. When the mobile working machine 200 has been very close to the docking side 102 of the docking station 100, the controlling unit 220 begins to electrically control the transmission wheel device 240 to attempt to move the mobile working machine 200 to the docking side 102 of the docking station 100. More specifically, when the transmission wheel device 240 moves the mobile working machine 200 to the docking side 102 of the docking station 100, the controlling unit 220 detects whether the first contacts 161 of the docking station 100 and the second contacts 231 of the mobile working machine 200 are electrically contacted with each other continuously; if yes, the controlling unit 220 next detects whether the sensing devices 250 are triggered by the confirmation elements 170; if yes, the controlling unit 220 determines that the return procedure is finished, and then electrically charges the power module 230 through the charging module 160. More specifically, the charging module 160 transmits the supply mains 400 to the power module 230 via the first contact 161 and the second contact 231 that are in contact with each other for charging the power module 230.

Because the confirmation elements 170 have been preliminarily made at a specific location of the docking station 100, as long as the controlling unit 220 detects that the sensing devices 250 are triggered by the confirmation elements 170, it tells that the mobile working machine 200 has successfully been docked to the docking station 100. Therefore, the mobile working machine 200 can be more accurately returned to the docking station 100, so as to guarantee that the second contacts 231 can be more efficiently contacted with the first contacts 161.

Conversely, when the sensing devices 250 are not triggered by the confirmation elements 170 while the mobile working machine 200 attempts to dock to the docking station 100 for a period of time in order to correct an incorrected or unexpected docking condition, the controlling unit 220 electrically controls the transmission wheel device 240 to move the mobile working machine 200 away from the docking station 100 for attempting to return to the docking station 100 again.

In the embodiment, for example but not to be limited, a convex plate 111 is provided on the docking side 102 of the docking station 100. The convex plate 111 is connected to the station base 110, and the first contacts 161 are exposed outwards from an outer surface of the convex plate 111. Thus, when the mobile working machine 200 arrives at the docking side 102 of the docking station 100, the bottom surface 211 of the machine body 210 of the mobile working machine 200 exactly overrides across the convex plate 111 such that the second contacts 231 of the mobile working machine 200 are in direct contact with the first contacts 161 of the docking station 100. However, in other embodiments, as long as the second contacts 231 can be in direct contact with the first contacts 161, the exact positions of the second contacts 231 and first contacts 161 are not limited in the disclosure.

In the embodiment, as shown in FIG. 1, for example but not to be limited, an indentation portion 101 is formed on the docking side 102 of the docking station 100 so as to receive at least a part of the mobile working machine 200. Therefore, not only the part of the mobile working machine 200 can be shielded and protected, but also the total volume of the mobile working machine 200 and the docking station 100 can be decreased.

In the embodiment, the two sensing devices 250 mentioned above are symmetrically arranged on the bottom surface 211 of the machine body 210. The two confirmation elements 170 mentioned above are symmetrically located on the docking side 102 of the docking station 100. For example but not to be limited, each of the sensing devices 250 is an optical transceiver, for example, a reflective infrared transceiver or a visible light transceiver. Each of the confirmation elements 170 is an optical control surface. The optical control surface, for example, can be an absorbed/reflective material or has a light deflecting/refractive surface. Specifically, each of the confirmation elements 170 includes a plate body 171 and an optical control coating layer 172. The optical control coating layer 172 for example can be a black light-absorbing coating layer. The plate body 171 is connected to one of the guiding portions, and the optical control coating layer is formed on one surface of the plate body. The optical control coating layer 172 is coated on the top surface of the plate body 171.

Therefore, when the mobile working machine 200 starts to attempt to dock to the docking station 100, the sensing devices 250 starts to emit lights towards the ground surface, since the mobile working machine 200 has not been moved above the confirmation elements 170 yet, the sensing devices 250 only can sense the reflective lights from the ground surface, so that the controlling unit 220 determines that the sensing devices 250 are not triggered by the confirmation elements 170 yet; on the contrary, when the mobile working machine 200 has been moved above the confirmation elements 170, because the optical control coating layer 172 is a black light-absorbing coating layer, the black light-absorbing coating layer avoids reflect lights back to the sensing devices 250. Thus, if the sensing devices 250 do not receive any reflective light from the confirmation elements 170 in a limited time period, the sensing devices 250 are then triggered to notify the controlling unit 220 so that the controlling unit 220 determines that the sensing devices 250 have been triggered by the confirmation elements 170.

However, the disclosure is not limited thereto, in another embodiment, the confirmation elements 170 may also be embodied in a form of stickers. Also, in another embodiment, a set of the aforementioned confirmation element and sensing device may also be embodied in a combination of a trigger button and a push portion. Thus, through the trigger button being pushed down by the push portion, the sensing device is therefore triggered by the confirmation element. In another embodiment, the aforementioned sensing device may also be a magnetic induction element, and the aforementioned confirmation element may also be a magnet. Therefore, through the magnetic induction element being induced by the magnet, the sensing device is therefore triggered by the confirmation element; or in another embodiment, the aforementioned sensing device may also be an image capturing device, and the confirmation element may also be a predetermined symbol. Therefore, through the predetermined symbol being captured and identified by the image capturing device, the sensing device can be triggered by the confirmation element. In addition, in another embodiment, the confirmation element may also be an electronic component capable of emitting inductive signals, and the sensing device can be sensed by the inductive signals.

As shown in FIG. 1 and FIG. 2, the docking station 100 further includes two guiding elements 120. The guiding elements 120 are respectively located on the docking side 102 of the docking station 100, and connected to the station base 110 so that a docking concave 150 is collectively defined by the station base 110 and the guiding elements 120, and the confirmation element 170 is located within the docking concave 150, and respectively connected to the guiding elements 120. The convex plate 111 is located between the guiding elements 120, and respectively connected to the guiding elements 120.

For example, the guiding elements 120 are, for example, arc-shaped blocks of the same shape. The guiding elements 120 are placed on the station base 110 according to a mirror reflection arrangement, and removably coupled to the station base 110. More particularly, the guiding elements 120 separately have guiding portions 130 which are protruded outwardly and faced with each other. Each of the guiding portions 130 is connected to one of the plate body 171 of the confirmation element 170. The guiding portions 130 collectively guide the mobile working machine 200 to continuously and slightly move to a desired direction in the docking concave 150 such that the sensing device 250 is able to be triggered by the confirmation element 170, or/and the first contacts 161 can be directly contacted by the second contacts 231. The guiding portions 130 are disposed at two opposite sides of the convex plate 111 or the first contacts 161. Each of the guiding portions 130 is provided with a top surface 131 and a guiding sidewall 132. The top surface 131 is opposite to the ground surface, and one part of each of the guiding sidewalls 132 is gradually adjacent to the convex plate 111 or the first contact 161. In the embodiment, for example but not to be limited, when the mobile working machine 200 is successfully docked into the docking concave 150, the lateral surface of the machine body 210 of the mobile working machine 200 is complementarily matched to the surfaces of the guiding elements 120. Each of the guiding sidewalls 132 is further provided with a planar portion 133 and a curved portion 134. The planar portion 133 is adjoined to the curved portion 134, and the curved portion 134 is closer to the first contacts 161 than the planar portion 133. The curved portion 134 is curved towards the convex plate 111, and each of the confirmation elements 170 is connected to the planar portion 133 and the curved portion 134.

Thus, when the mobile working machine 200 attempts to dock to the docking station 100, through the guidance of the guiding portions 130, the mobile working machine 200 is able to correctly and rapidly dock to the correct position in the docking concave 150. At the moment, since the confirmation elements 170 have been preliminarily placed to a desired direction, the sensing devices 250 can be more effectively triggered by the confirmation elements 170 through the guidance of the guiding portions 130 so as to increase the success rate of the mobile working machine 200 returning to the docking station 100.

Furthermore, the docking station 100 further includes two first alignment portions 140. The first alignment portions 140 are located at the docking side 102 of the docking station 100. In the embodiment, each of the first alignment portions 140 is disposed on one of the guiding elements 120 between one of the guiding portions 130 and the convex plate 111. Each of the first alignment portions 140, for example, has a sharp cone body, and the tip of each of the first alignment portions 140 extends away from the docking station 100. Each of the confirmation elements 170 is a plate member, and adjoined to one of the guiding portions 130 and one of the first alignment portions 140. The mobile working machine 200 further includes two second alignment portions 214. Each of the second alignment portions 214 is aligned with one of the first alignment portions 140, and is complementarily matched to the first alignment portion 140, so as to complementarily splice with the first alignment portion 140. In the embodiment, each of the second alignment portions 214 is disposed on the bottom surface 211 of the machine body 210, and for example, has a concave cone recess, and the tip of each of the second alignment portions 214 extends away from a lateral side of the machine body 210.

Thus, when the mobile working machine 200 is docked into the docking concave 150 of the docking station 100, through the first alignment portions 140 being complementarily spliced by the second alignment portions 214, respectively, the position of the mobile working machine relative to the docking station can be positioned more accurately. At the same time, because the confirmation elements 170 has been preliminarily made at a specific location of the docking station 100, once the first alignment portions 140 are complementarily received the second alignment portions 214, respectively, so that the possibilities of the sensing devices 250 been triggered by the confirmation elements 170 can be increased so as to further increase the success rate of the mobile working machine 200 returning to the docking station 100.

In the embodiment, the mobile working machine 200 further includes two rotating members 260. The rotating members 260 are rotatably disposed on the mobile working machine 200, and arranged opposite to each other. Each of the rotating members 260 is able to directly roll on one of the guiding sidewalls 132. For example, each of the rotating members 260, for example, is a rotation wheel. Each of the rotation wheels is pivoted in a recess 212 formed on the bottom surface 211 of the machine body 210. Each of the rotation wheels is provided with a first rotation axis line 261, that is, each of the rotation wheels rotates about the first rotation axis line 261. The transmission wheel device 240 includes two wheels 241. The wheels 241 are respectively pivotally connected to the machine body 210, and the wheels 241 are coaxial with each other. Each of the wheels 241 is provided with a second rotation axis line 242, that is, each of the wheels 241 rotates about the second rotation axis line 242. Thus, when the transmission wheel device 240 of the mobile working machine 200 is put on a ground surface, each of the first rotation axis lines 261 passes through the ground surface, and the first rotation axis lines 261 of the rotation wheels are parallel with each other. Each of the first rotation axis lines 261 is orthogonal to the second rotation axis line 242 of the wheels 241.

It is to be noted that each of the rotating members 260 is an idle rotation wheels, and not driven to rotate by electrical power. That is, the rotating members 260 may be pushed to rotate with the interference of the guiding sidewall 132 of the guiding portion 130. However, the disclosure is not limited thereto, in another embodiment, these rotating members 260 can also be modified to be driven to rotate by electrical power, or to be synchronized to rotate with the wheels 241 of the transmission wheel device 240 together.

Figure 4A:
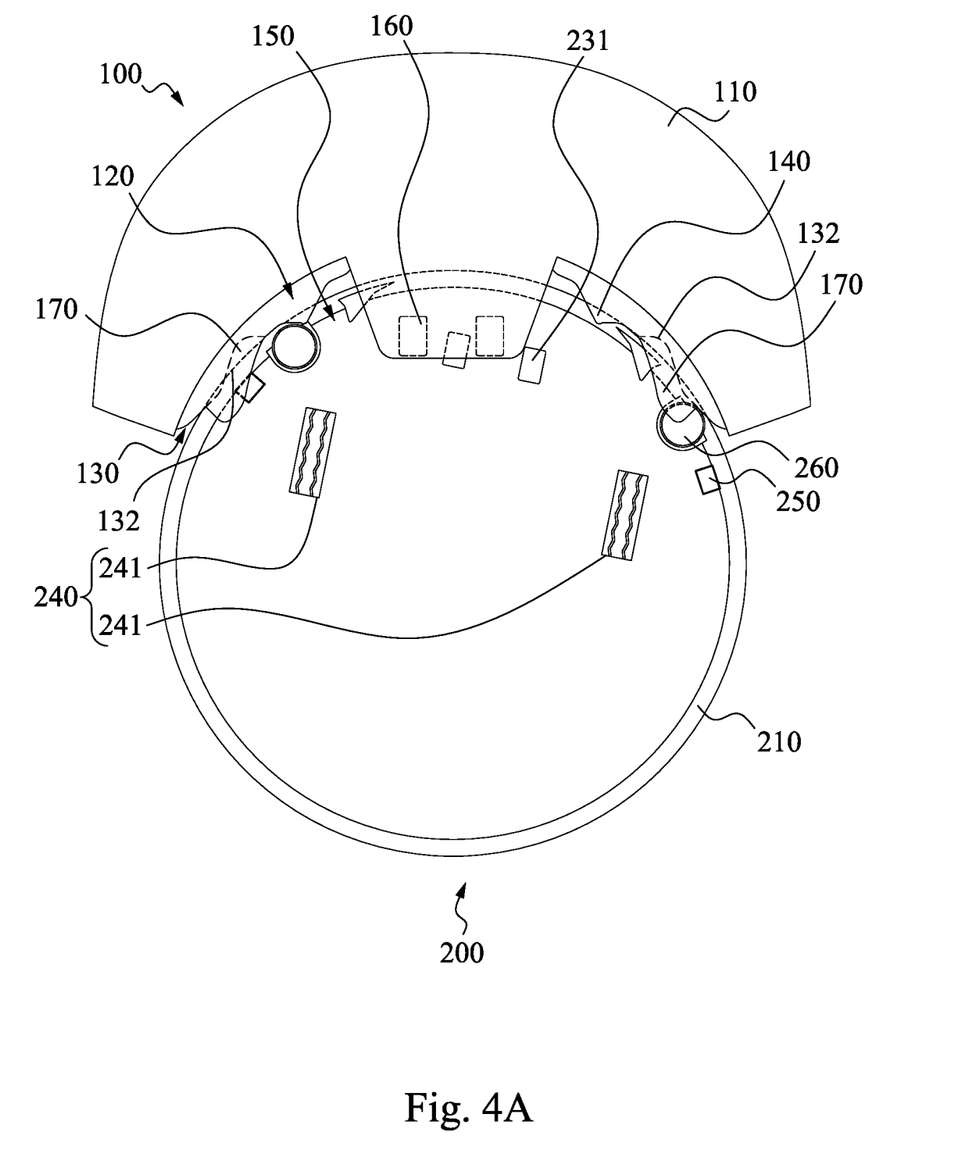
FIG. 4A-FIG. 4C are continuous schematic views that the mobile working machine attempts to dock to the docking station.
Figure 4B:
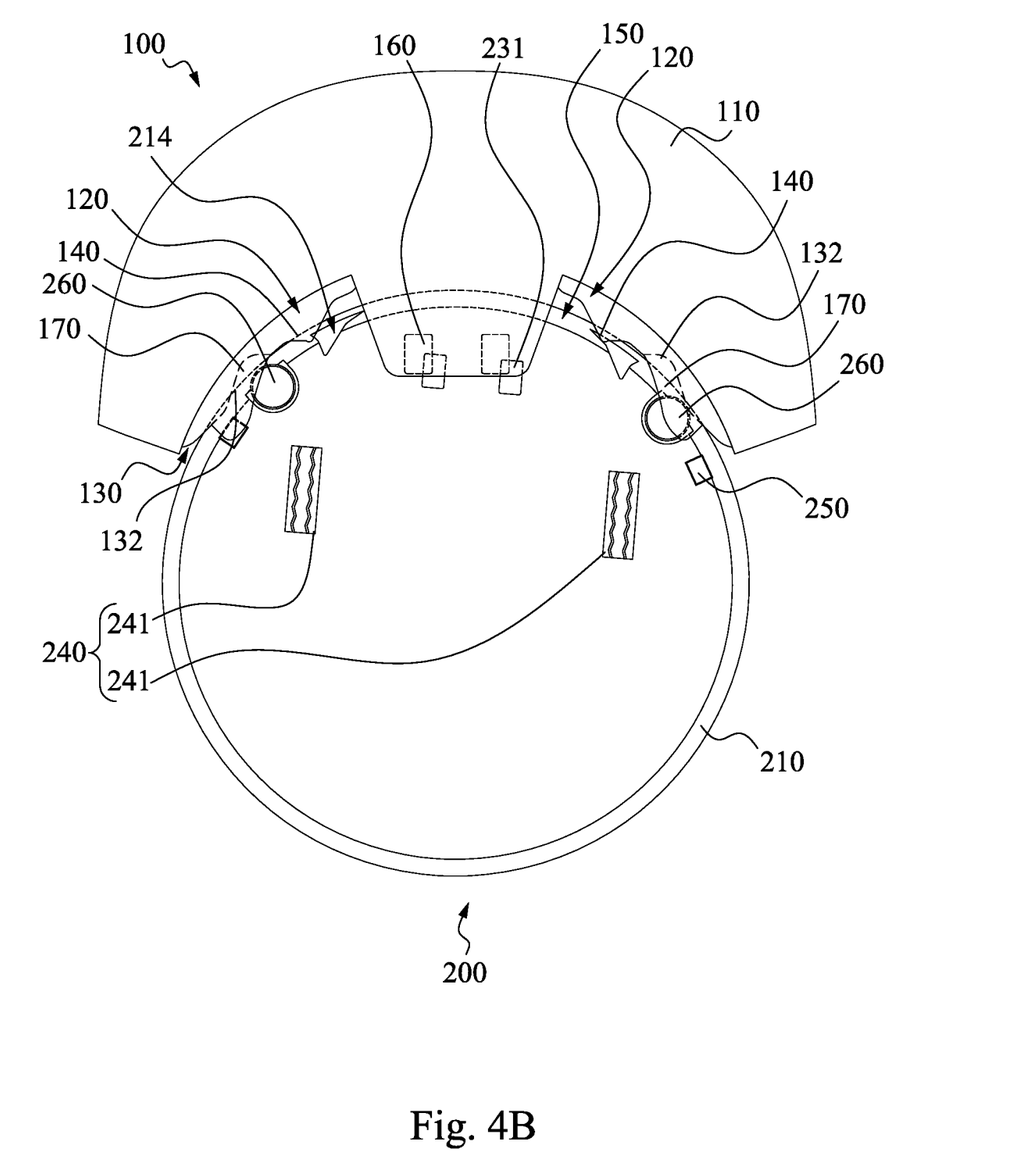
Figure 4C:
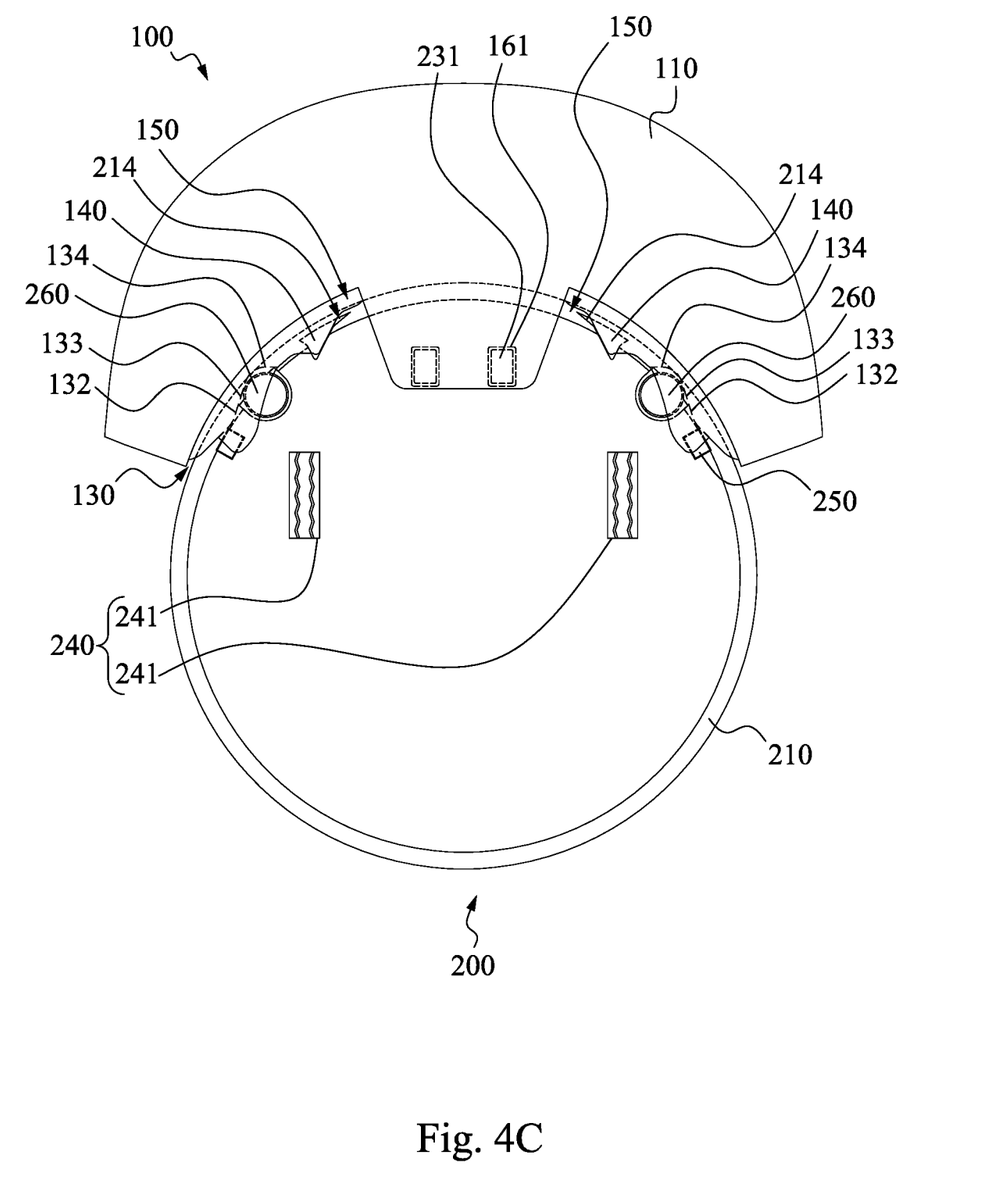

FIG. 4A-FIG. 4C are continuous schematic views that the mobile working machine 200 attempts to dock to the docking station 100. As shown in FIG. 4A and FIG. 4B, when the mobile working machine 200 fails to dock in the docking concave 150 of the docking station 100 correctly at the beginnings, for example, the mobile working machine 200 is deviated to the docking concave 150, the aforementioned second alignment portions 214 of the mobile working machine 200 are gradually moved to align with the aforementioned first alignment portions 140 of the docking station 100 by the rotating members 260 respectively colliding with the guiding sidewall 132 of the guiding portion 130 in the docking concave 150 repeatedly, that is, the rotating members 260 respectively roll onto and push the guiding sidewalls 132 along the guiding sidewalls 132. Thus, the second alignment portions 214 of the mobile working machine 200 can be spliced with the first alignment portions 140 slowly. Finally, as shown in FIG. 4C, through the guidance of the guiding portions 130 and the alignment of the first alignment portions 140, the second contacts 231 of the mobile working machine 200 can be in direct contact with the first contacts 161 of the docking station 100, and the sensing devices 250 can be successfully triggered by the confirmation elements 170, so that the mobile work machine 200 is successfully docked into the docking concave 150 of the docking station 100.

It is to be noted, when the mobile working machine 200 docks into the docking concave 150 of the docking station 100, the planar portion 133 and the curved portion 134 of the guiding sidewall 132 can be served as a buffer portion of the mobile working machine 200 for stopping the rotating members 260 continuously moving so that each of the rotating members 260 can be directly abutted to the planar portion 133 and the curved portion 134 of one of the guiding sidewalls 132.

Furthermore, the disclosure is not limited to charging the mobile working machine in a physical contact manner, that is, the presence of the second contact 231 and the first contact 161 can be omitted on the mobile working machine. In other words, the charging mode of the power module 230 and the charging module 160 of the disclosure may also be modified to a wireless charging mode so as to charge the mobile working machine in a wireless charging manner; alternatively, as long as the mobile working machine 200 has an extra power supply source such as a replaceable battery thereon, the charging module 160 is not needed to be installed to the docking station 100, that is, the docking station of the disclosure is not limited to be a charging station for the mobile working machine.

In the embodiment, the mobile working machine 200 is a vacuum sweeping machine in which a suction opening 213 is formed on the bottom surface 211 of the machine body 210, and the suction opening 213 is disposed between the wheels 241. However, the disclosure is not limited to the type of mobile work machine 200. For example, in other embodiments, the mobile work machine 200 can also be a mopping machine, a security patrol machine, or a detachable base 310 of an intelligent robot 300.

Figure 5:
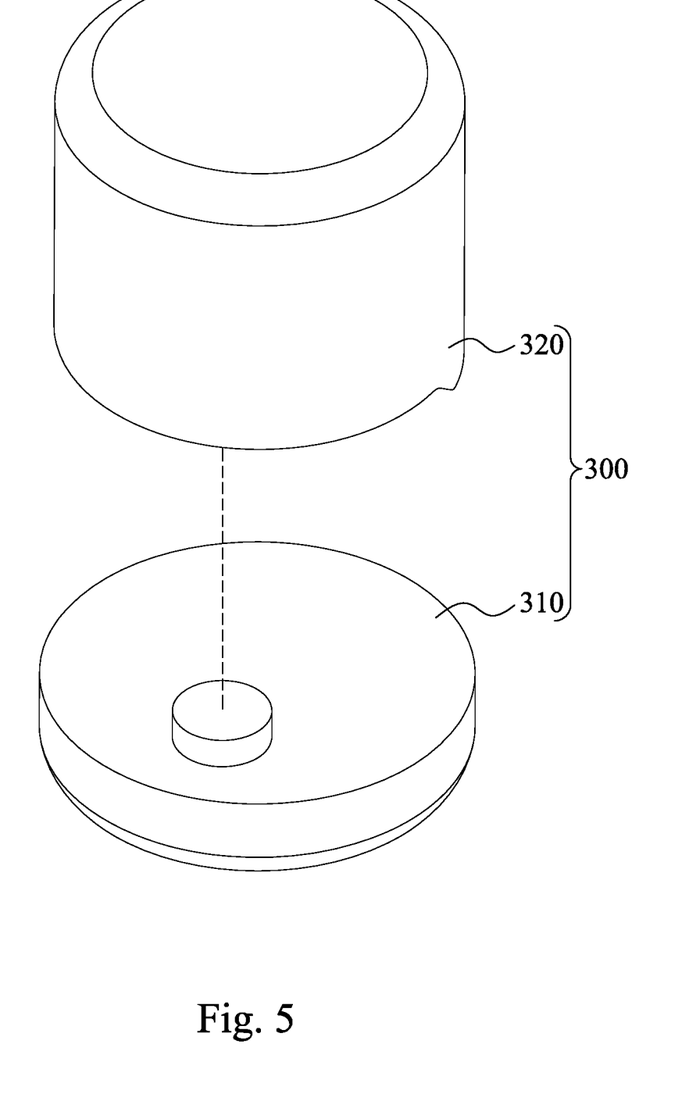
FIG. 5 is an exploded view of a robotic system according to another embodiment of the disclosure.

FIG. 5 is an exploded view of a robotic system according to another embodiment of the disclosure. As shown in FIG. 1 and FIG. 5, the intelligent robot 300 includes a detachable base 310 and a smart host computer 320. The smart host computer 320 can be detachably connected to the top of the detachable base 310 and can be moved to any position by the detachable base 310. The detachable base 310 can be embodied as a mobile working machine of the disclosure. Therefore, when the detachable base 310 is successfully docked to the docking station 100, the detachable base 310 is able to load and move the smart host computer 320 to a desired direction of the docking station 100 so that the docking station 100 can be accurately aligned with the smart host computer 320 so as to facilitate the docking station 100 to perform task operations (e.g., charging or contact) to the detachable base 310 or the smart host computer 320 above the detachable base 310. Thereby, preventing the docking station 100 from generating unintended errors on the detachable base 310 or the smart host computer 320.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A robotic system capable of facilitating return alignment, comprising:

a docking station comprising a confirmation element having an optical control surface, and a charging module having a first contact; and     a mobile working machine comprising a machine body, a transmission wheel device disposed on a bottom surface of the machine body, at least one sensing device disposed on the bottom surface of the machine body, and a power module electrically connected to the at least one sensing device and the transmission wheel device, wherein the power module comprises a second contact, wherein the at least one sensing device is an optical transceiver,     wherein, when the machine body of the mobile working machine is moved to one side of the docking station above the optical control surface by the transmission wheel device, the optical transceiver emits lights towards the optical control surface, and when the optical transceiver does not receive any reflective light from the optical control surface after the optical transceiver emits lights to the optical control surface, the optical transceiver is triggered by the optical control surface, the power module is electrically charged by the charging module as the first contact and the second contact are contacted with each other.

2. The robotic system of claim 1, wherein when the mobile working machine moves to the one side of the docking station, and when the at least one sensing device is not triggered by the confirmation element in a period of time, the transmission wheel device moves the mobile working machine away from the docking station for attempting to return to the docking station again.

3. The robotic system of claim 1, wherein the docking station further comprises:

two guiding portions disposed on the one side of the docking station, and arranged at two opposite sides of the first contact, and configured to guide the mobile working machine to dock correctly such that the at least one sensing device is able to be triggered by the confirmation element.

4. The robotic system of claim 3, wherein each of the two guiding portions is provided with a guiding sidewall and the guiding sidewalls of the two guiding portions are faced opposite to each other, and one part of each of the guiding sidewalls is gradually adjacent to the first contact; and     the mobile working machine further comprises two rotating members, the two rotating members are rotatably disposed on the mobile working machine, and arranged opposite to each other, the two rotating members are able to directly roll on the guiding sidewalls, respectively.

5. The robotic system of claim 3, wherein the confirmation element comprises a plate body and an optical control coating layer, the plate body is connected to one of the two guiding portions, and the optical control coating layer is formed on one surface of the plate body.

6. The robotic system of claim 1, wherein the docking station further comprises at least one first alignment portion which is located at the one side of the docking station; and     the mobile working machine further comprises at least one second alignment portion which is complementarily matched to the first alignment portion and configured to splice with the first alignment portion so as to determine the correct positions of the mobile working machine and the docking station.

7. The robotic system of claim 1, wherein the mobile working machine is a vacuum sweeping machine, a mopping machine, a security patrol machine, or a detachable base of an intelligent robot.

8. A robotic system capable of facilitating return alignment, comprising:
- a mobile working machine comprising a machine body, at least one sensing device and a transmission wheel device, wherein the transmission wheel device and the at least one sensing device are respectively disposed on a bottom surface of the machine body, the at least one sensing device is an optical transceiver, and the transmission wheel device is configured to load and move the machine body; and
- a docking station comprising a station base, a confirmation element having an optical control surface, and two guiding elements, wherein the two guiding elements are connected to the station base so that a docking concave is collectively defined by the station base and the two guiding elements, and the confirmation element is located within the docking concave, each of the two guiding elements is provided with a guiding portion, the guiding portions of the two guiding elements are configured to guide the mobile working machine to dock correctly such that the at least one sensing device is able to be triggered by the confirmation element,
- wherein, when the machine body of the mobile working machine is moved to one side of the docking station to park above the optical control surface by the transmission wheel device, the optical transceiver emits lights towards the optical control surface, and when the optical transceiver does not receive any reflective light from the optical control surface after the optical transceiver emits lights to the optical control surface, the optical transceiver is triggered by the optical control surface,
- when the at least one sensing device is not triggered by the optical control surface in a period of time, the transmission wheel device moves the machine body away from the docking concave, and then attempts to return to the docking concave again.

9. The robotic system of claim 8, wherein the mobile working machine further comprises two rotating members, the two rotating members are rotatably disposed on the machine body, and arranged opposite to each other, each of the two rotating members is able to directly roll on one of the guiding portions.

10. A mobile working machine, comprising:
- a machine body;
- at least one rotating member rotatably disposed on the machine body, and configured to directly roll on one sidewall of a docking station;
- at least one sensing device disposed on a bottom surface of the machine body, wherein the at least one sensing device is an optical transceiver; and
- a transmission wheel device disposed on the bottom surface of the machine body, and configured to load and move the machine body on a ground surface,
- wherein a rotation axis line of the at least one rotating member is orthogonal to a rotation axis line of the transmission wheel device,
- wherein when the machine body attempts to dock to the docking station, the optical transceiver starts to emit lights to the ground surface.

\* \* \* \* \*

UNITED STATES PATENT AND TRADEMARK OFFICE
CERTIFICATE OF CORRECTION

| | | |
|---|---|---|
| PATENT NO. | : 11,298,831 B2 | |
| APPLICATION NO. | : 16/166268 | |
| DATED | : April 12, 2022 | |
| INVENTOR(S) | : Tsai et al. | |

It is certified that error appears in the above-identified patent and that said Letters Patent is hereby corrected as shown below:

On the Title Page

Item (30), the Foreign Application Priority Data is missing, input "June 28, 2018 (TW)....................107122386".

Signed and Sealed this
Fourteenth Day of June, 2022

Katherine Kelly Vidal
*Director of the United States Patent and Trademark Office*